3,089,868
DISAZO DYES

Ermanno Gaetani, Milan, Italy, assignor to Aziende Colori Nazionali Affini Acna S.p.A., Milan, Italy, a corporation of Italy
No Drawing. Filed Apr. 14, 1960, Ser. No. 22,122
Claims priority, application Italy Dec. 15, 1959
6 Claims. (Cl. 260—186)

An object of the present invention is a new class of water insoluble disazo dyes possessing the general Formula A

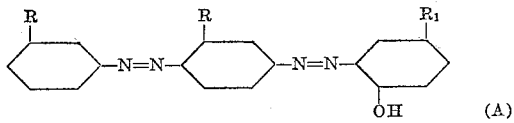

wherein R is selected from the group consisting of chlorine and methyl group, $R_1$ is selected from the group consisting of chlorine and cycloalkyl.

The dyes possessing the above mentioned general Formula A are suitable for the direct dyeing of polyolefin materials by simple application at the boiling temperature of the dyeing bath.

Among the dyes possessing general Formula A, the following dyes have shown to be particularly suitable to dye polypropylene and polyethylene materials:

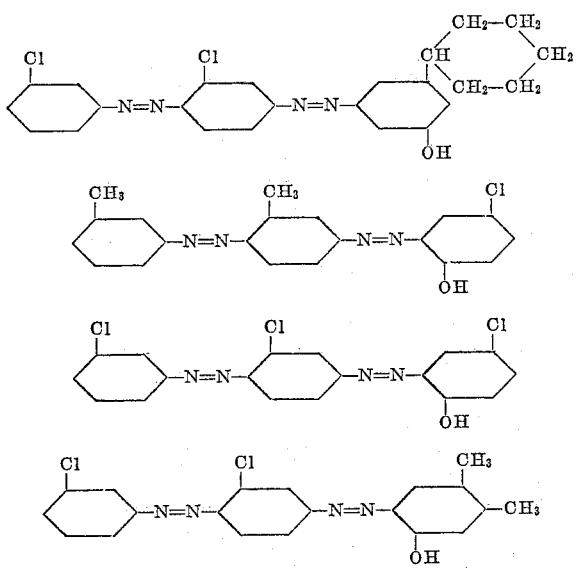

The compounds possessing general Formula A are obtained by coupling in the presence of a strong base one mol of an amino azo compound of the type

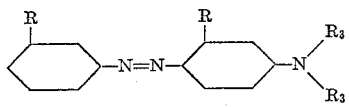

wherein R has the above mentioned meaning and $R_3$ is hydrogen, with one mol of a compound of the type

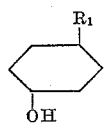

wherein $R_1$ has the above mentioned meaning.

The following examples will further illustrate my invention however without limiting its scope (all parts are by weight unless otherwise indicated).

Example 1

26.6 g. 4-amino-2,3'-dichloro azo benzene (prepared according to Niementowsky, Anz. Wiss. Krakav, 1902, 413, fr. C., 1902, II, 938) are diazotised as usual in 300 g. water and 35 g. hydrochloric acid solution (specific gravity 1.17) by addition of a solution of 7 g. sodium nitrite in 20 water.

The temperature is kept at about 10–15° C. by careful addition of ice. When the diazotisation is completed, the diazo-azo compound thus obtained, partially in suspension, is added to a solution of 14 g. p-chlorophenol in 200 g. water and 14 g. sodium hydroxide solution (38° Bé.) by adding at the same time 50 g. sodium acetate.

When the coupling is completed the mass is briefly heated to 60° C., the precipitated disazo dye is filtered, washed with water until neutral, and is dried thus obtaining a brown yellow powder (melting point 205° C.) having the following formula:

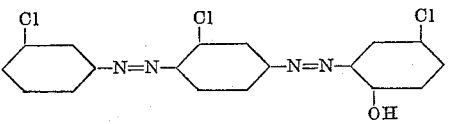

By chromatographic examination on paper (eluent: organic portion of the mixture butanol: acetic acid: water-4:1:5) the dye gives a uniform reddish-yellow spot which turns to violet with sodium hydroxide and remains unaltered with hydrochloric acid.

Example 2

26.6 g. 4-amino-2,3'-dichloro-azobenzene are diazotised as described in Example 1, the diazo-azo compound thus obtained is added to a solution of 19 g. p-cyclohexylphenol in a mixture of 100 g. water 50 g. pyridine and 14 g. concentrated sodium hydroxide solution (36 Bé.).

At the end of the coupling, the disazo dye obtained is separated by acidifying with a hydrochloric acid solution until a positive reaction is obtained with a Congo red indicator, filtering, washing and drying the precipitate; a brown powder with a melting point of 115° C. is obtained, having the formula:

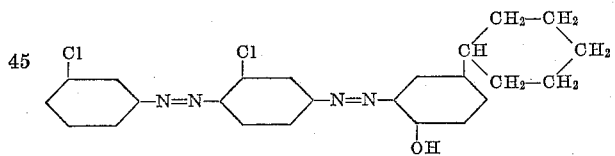

By chromatographic examination on paper the dye gives a uniform slightly brown yellow spot which turns to violet with a sodium hydroxide solution and remains unaltered with hydrochloric acid.

Example 3

26.6 g. 4-amino-2,3'-dichloro-amino-azo-benzene are diazotised as described in Example 1; the diazo-azo compound thus obtained is added to a solution of 13 g. 3,4-xylenol (1-hydroxy-3,4-dimethylbenzene) in 250 g. water and 14 g. of a sodium hydroxide solution (36 Bé.), also adding 50 g. sodium acetate.

The disazo dye thus formed is separated by heating to 60° C., filtered, washed to neutrality and is finally dried. It consists o fa dark yellow power (melting point 178° C.) having the formula:

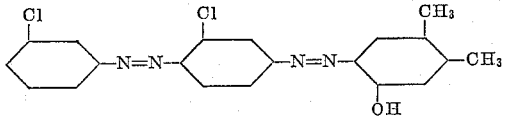

By chromatography it presents a reddish-yellow spot

Example 4

19.7 g. 4-amino-azobenzene are diazotised in conventional manner and the diazo-azo-compound obtained is added to a solution of 14 g. 4-chlorophenol, proceeding as described in Example 1.

The disazo dye thus obtained, having the formula:

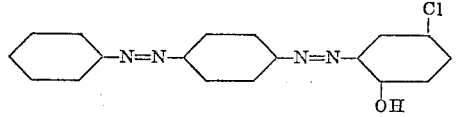

consists of a brown-yellow powder (melting point 174° C.) which by chromatography appears to be an uniform yellow spot which turns to red with alkalies and remains unaltered with acids.

Example 5

22.5 g. 4-amino-2,3'-dimethylazobenzene are diazotised as usual, the diazo-azo compound is added to a solution of 14 g. 4-chlorophenol in 200 g. water and 14 g. sodium hydroxide solution (36° Bé.), adding at the same time also 50 g. sodium acetate.

When the coupling is completed, the disazo dye is isolated as in Example 1.

The dye obtained having the formula:

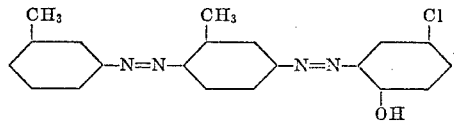

is a dark brown (melting point 160° C.); by paper chromatography it gives uniform yellow spot which turns to red with alkalies and remains unaltered with acids.

Having thus described my invention, what I desire to secure and claim by Letters Patent is:

I claim:

1. A disazo dye, insoluble in water and having a formula selected from the group consisting of

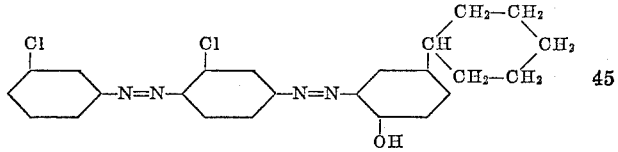

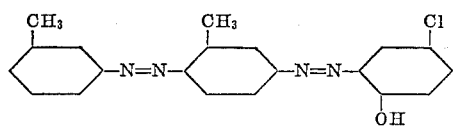

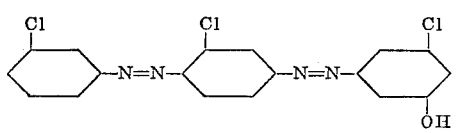

and

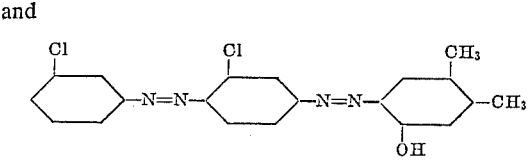

2. A disazo dye, insoluble in water, having the formula:

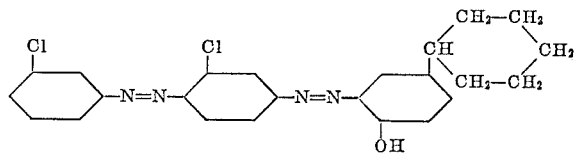

3. A disazo dye, insoluble in water, having the formula:

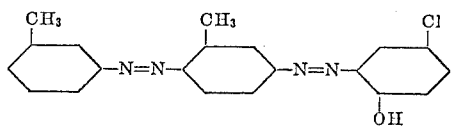

4. A disazo dye, insoluble in water, having the formula:

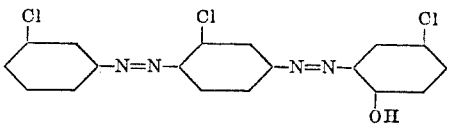

5. A disazo dye, insoluble in water, having the formula:

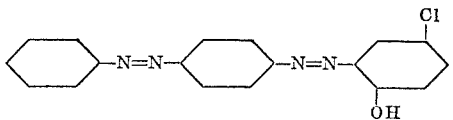

6. A disazo dye, insoluble in water, having the formula:

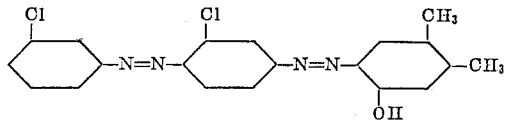

References Cited in the file of this patent

UNITED STATES PATENTS 2,424,627    Olpin et al. _____ July 29, 1947

FOREIGN PATENTS 198,710    Switzerland _____ Sept. 16, 1938